United States Patent
Yamashita et al.

(10) Patent No.: US 6,940,793 B2
(45) Date of Patent: Sep. 6, 2005

(54) DISK DEVICE AND METHOD OF CHANGING ROTATIONAL SPEED OF DISK DEVICE

(75) Inventors: Akiyoshi Yamashita, Matsuyama (JP); Masatsugu Yamahana, Matsuyama (JP); Shin'ichi Kambe, Matsuyama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 637 days.

(21) Appl. No.: 09/936,361

(22) PCT Filed: Feb. 2, 2001

(86) PCT No.: PCT/JP01/00762

§ 371 (c)(1),
(2), (4) Date: Sep. 13, 2001

(87) PCT Pub. No.: WO01/59782

PCT Pub. Date: Aug. 16, 2001

(65) Prior Publication Data

US 2002/0159365 A1 Oct. 31, 2002

(30) Foreign Application Priority Data

Feb. 8, 2000 (JP) ........................................ 2000-030057

(51) Int. Cl.$^7$ ................................................ G11B 5/09
(52) U.S. Cl. ................................... 369/47.39; 369/53.3
(58) Field of Search ........................... 369/47.38, 47.39, 369/53.3, 53.37, 53.43, 53.45, 47.47, 47.55

(56) References Cited

U.S. PATENT DOCUMENTS

| 5,982,570 | A | * | 11/1999 | Koizumi et al. | ............... 360/69 |
| 6,151,182 | A | | 11/2000 | Koizumi et al. | |
| 6,154,428 | A | | 11/2000 | Lee | |
| 6,373,801 | B2 | | 4/2002 | Ichikawa | |
| 2002/0003763 | A1 | | 1/2002 | Ichikawa | |

FOREIGN PATENT DOCUMENTS

| CN | 1113590 | 12/1995 |
| CN | 1235344 | 11/1999 |
| EP | 0686971 B1 | 12/1995 |
| JP | 7334950 | 12/1995 |
| JP | 8083149 | 3/1996 |
| JP | 10333773 | 12/1998 |
| JP | 11066702 | 3/1999 |
| JP | 11328828 | 11/1999 |
| JP | 2000021078 | 1/2000 |
| JP | 2000293931 | 10/2000 |
| WO | 9827549 | 6/1998 |
| WO | 0060588 | 10/2000 |
| WO | 0060688 | 10/2000 |

OTHER PUBLICATIONS

Chinese Office Action dated Feb. 13, 2004 with English translation.
International Search Report dated Apr. 17, 2001.
"Okotae shimasu; Mail ya Internet Button wa Donovouna Shikumi ni Natte iruno?" Nikkei Personal Computing, No. 341, Nikkei BP K.K., Nippon, CSNW20001078011, Jul. 12, 1999, pp. 256–257.
Patent Abstract of Japan; JP 11–328828, A (Funai Electric) Nov. 30, 1999, whole document.

* cited by examiner

*Primary Examiner*—Paul W. Huber
(74) *Attorney, Agent, or Firm*—Stevens, Davis, Miller & Mosher, LLP

(57) ABSTRACT

A disk drive includes a disk motor for rotating a disk, a disk motor driving unit for driving the disk motor, and a controlling unit for controlling the disk motor driving unit. When an upper limit value of a disk rotation speed is received as an input value, the input value is interpreted as a rotation speed specification, so that a command packet including the upper limit value of the disk rotation speed is generated to output it to a controlling unit. The controlling unit sets the upper limit value of the disk rotation speed included in the command packet to the disk motor driving unit. The disk motor driving unit drives the disk motor at the upper limit value of the set disk rotation speed.

8 Claims, 13 Drawing Sheets

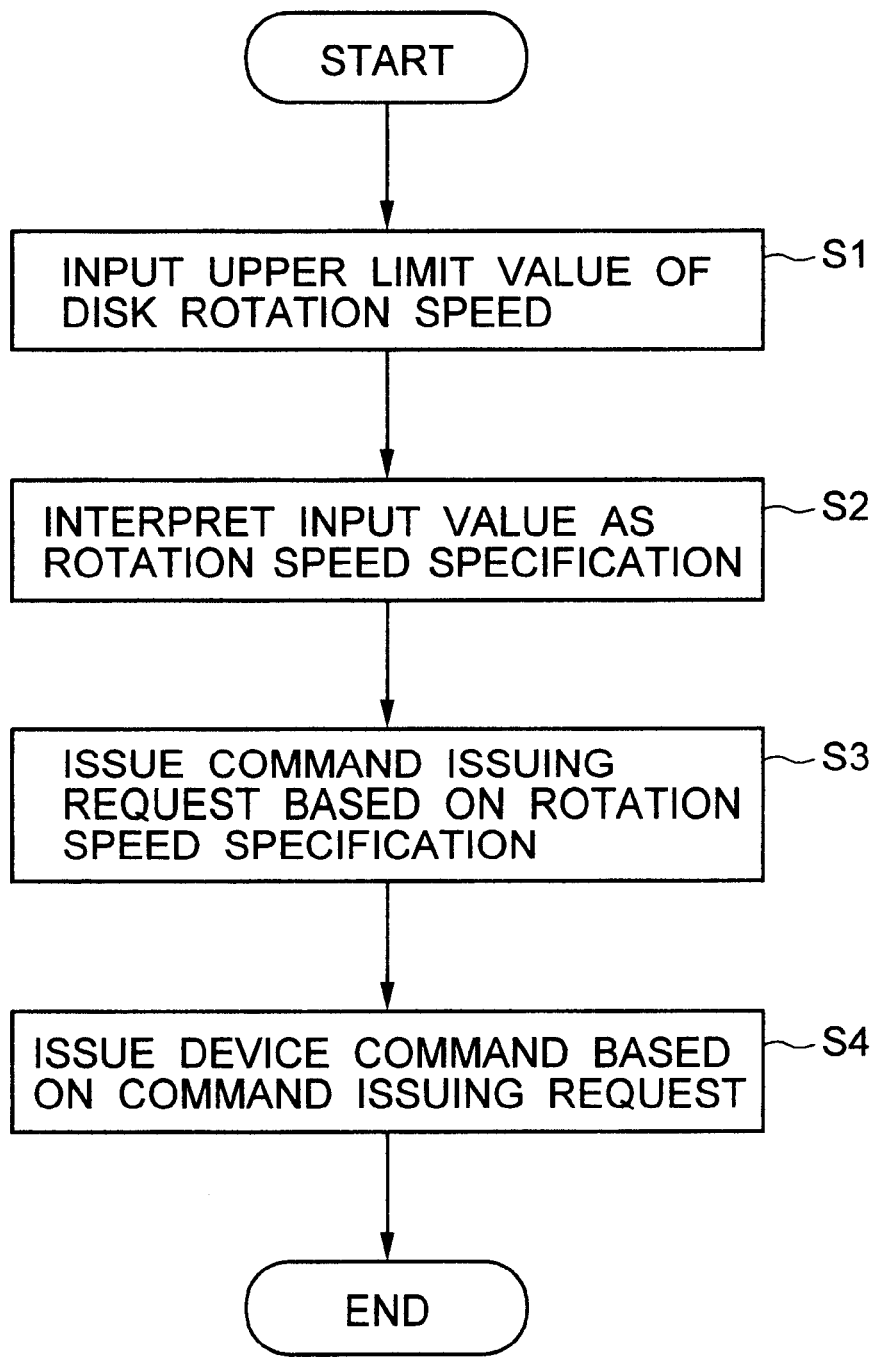

DISK DEVICE AND METHOD OF CHANGING ROTATIONAL SPEED OF DISK DEVICE

TECHNICAL FIELD

The present invention generally relates to a rotation speed changing method for a disk drive and a disk drive. More particularly, the present invention relates to a digital computer/data processing apparatus capable of changing a rotation speed of a disk drive with software, and provides a concrete technology that enables to lessen the vibrations and noises of the disk drive.

BACKGROUND ART

Conventionally, the countermeasure to lessen the vibrations and noises of the disk drive have been mainly focused on the structure of the disk drive, concretely, the addition of vibration-absorbing materials and noise-preventing materials. The upper limit value of the disk rotation speed of the disk device is predetermined on the disk drive side. In a case where the vibrations are sensed by a vibration sensor or a servo error signal with the upper limit value as the maximum rotation speed, the disk rotation speed is automatically slowed down. However, except such a special case, the disk drive operates at the maximum rotation speed corresponding to the upper limit value, so that the rotation of the disk brings about relatively large vibrations and noises. Further, each user feels the noise uncomfortably or not with his or her own sense. Hence, the upper limit value of the disk rotation might be made lower than actually required. Moreover, the conventional disk drive has no means of changing the upper limit value of the disk rotation speed on the user's side.

However, in response to the recent request for speeding up the processing of data and lowering the cost, the disk drive has been devised to speed up the disk rotation speed and reduce the components in number. For this purpose, the change of hardware such as an electric circuit like a motor and a structure has been carried out. For each change is required a new countermeasure for preventing the vibrations and noises.

Moreover, the user cannot practically change the upper limit value of the disk rotation speed of the disk drive because the user has to design complicated software based on technical knowledge and give a special instruction to the disk drive.

DISCLOSURE OF INVENTION

It is an object of the present invention to provide a rotation speed changing method for a disk drive and a disk drive which allows a user to optionally change the upper limit value of the disk rotation speed of the disk drive without changing the hardware design of the disk drive.

It is another object of the present invention to provide a rotation speed changing method for a disk drive and a disk drive which requires no addition of components to and no change of hardware on the disk drive side in order to lessen the noises and vibrations even if the redesign of the disk drive such as a CD-ROM drive causes the rotation speed or the mechanical structure to be changed.

In order to solve the above-mentioned problems, the present invention makes it possible to create application software to be operated on an operating system and change the upper limit value of the disk rotation speed of the disk drive into a predetermined value by a user. Therefore, the user can lessen the vibrations and the noises of the disk drive. Further, the manufacturer does not need to change the hardware for preventing the vibrations and noises each time the hardware of the disk drive is changed. Moreover, by making the program according to the invention reside in the operating system, the upper limit value of the disk rotation speed can be changed more easily. Further, even for the existing disk drives or other manufacturer's disk drives, the upper limit value of the disk rotation speed can be changed merely by adding the program according to the present invention.

According to the first rotation speed changing method for a disk drive of the present invention, the disk drive comprises a disk motor for rotating a disk, a disk motor driving unit for driving a disk motor, and a controlling unit for controlling the disk motor driving unit, and the rotation speed changing method comprises:

a receiving step of receiving an upper limit value of a disk rotation speed as an input value;

a generating step of interpreting the input value as a rotation speed specification to generate a command packet including the upper limit value of the disk rotation speed;

an outputting step of outputting the command packet to the controlling unit of the disk drive;

a setting step of setting the upper limit value of the disk rotation speed, which is included in the command packet, to the disk motor driving unit by the controlling unit; and a driving step of driving the disk motor at the set upper limit value of the disk rotation speed by the disk motor driving unit.

Thereby, it is possible to lessen the unnecessary vibrations and noises by changing the upper limit value of the disk rotation speed, which is preset to the disk drive, to the lower upper limit value of the disk rotation speed.

According to the second rotation speed changing method for a disk drive of the present invention, the disk drive is controlled by a computer; and the computer is operated under the control of a program including the receiving step and the generating step.

An example of the program will be described with reference to FIG. 13. The program includes a step S1 of inputting an upper value (input value) of the disk rotation speed by the user; a step S2 of interpreting the input value as a rotation speed specification; a step S3 of issuing a command issuing request to a device driver based on the rotation speed specification; and a step S4 of causing the device driver to issue the device command to the disk drive based on the command issuing request.

According to the third rotation speed changing method for a disk drive of the present invention, the program resides in the computer.

For example, this resident program is placed on a task tray.

According to the fourth rotation speed changing method for a disk drive of the present invention, in the third rotation speed changing method for a disk drive of the present invention, the computer comprises an input apparatus; and a key for starting the program is allocated to the input apparatus.

For example, using a function key located on a keyboard as the key for starting the program, the program may be started more easily.

According to the fifth rotation speed changing method for a disk drive of the present invention, the disk drive is controlled by a computer;

the computer comprises an input apparatus and an operating system connected to the input apparatus, and is operated by a program running on the operating system;

a key for starting the program running on the operating system is allocated to the input apparatus; and when the program running on the operating system is started with the key, the operating system executes the receiving step, the generating step and the outputting step.

According to the sixth rotation speed changing method for a disk drive of the present invention, in the third rotation speed changing method for a disk drive of the present invention, the computer comprises an input apparatus; and a key for starting the program is allocated to the input apparatus.

According to the seventh rotation speed changing method for a disk drive of the present invention, in the third rotation speed changing method for a disk drive of the present invention, the disk drive further comprises a detecting unit for detecting whether or not the disk is replaced; and when the detecting unit detects that the disk is replaced, the controlling unit controls the disk motor driving unit so as to change the upper limit value of the disk rotation speed to an initial value.

Thereby, it is possible to easily set the optimal upper limit value of the disk rotation speed for the disk after replacing.

According to the eighth rotation speed changing method for a disk drive of the present invention, in the first rotation speed changing method for a disk drive of the present invention, the disk drive further comprises a memory for storing an upper limit value of a disk rotation speed before the turn-off of the disk drive; and when turning on the disk drive, the controlling unit reads out the upper limit value of the disk rotation speed before the turn-off of the disk drive from the memory to set the read-out upper limit to the disk motor driving unit.

For example, in a case where the disk drive is turned off in the state of changing the first upper limit value of the disk rotation speed preset to the disk drive into the second slower upper limit value of the disk rotation speed by operating the program resided in the operating system, the upper limit value of the disk rotation speed is automatically returned to the second upper limit value of the disk rotation speed when the disk drive is turned on again. Thereby, it is possible to use the same disk before and after the disk drive is turned on again without setting the optimal rotation speed.

According to the ninth rotation speed changing method for a disk drive of the present invention, in the third rotation speed changing method for a disk drive of the present invention, the disk drive further comprises:

a detecting unit for detecting whether or not the disk is replaced; and a memory for storing an upper limit value of the disk rotation speed before the replacement of the disk; and when the detecting means detects that the disk is replaced, the controlling unit reads out the upper limit value of the disk rotation speed before the replacement from the memory to set the read-out upper limit value to the disk motor driving unit.

In a case where the disk is replaced in a state of changing the first upper limit value of the disk rotation speed preset to the disk drive to the second slower upper limit value of the second disk rotation speed by operating the program resided in the operating system, the user can manually operate a button allocated to the input apparatus or an application program so that the upper limit value of the disk rotation speed can be returned to the first upper limit value of the disk rotation speed with a simple operation. Conversely, in a case where the disk drive is turned off in a state of changing the first upper limit value of the disk rotation speed to the second upper limit value of the disk rotation speed, the upper limit value of the disk rotation speed can be automatically returned to the second upper limit value of the disk rotation speed when the disk driver is turned on again.

According to the tenth rotation speed changing method for a disk drive of the present invention, in the ninth rotation speed changing method for a disk drive of the present invention, the disk drive further comprises a switch connected with the controlling unit; and when the detecting unit detects that the disk is replaced, according to the state of the switch, the controlling unit controls the disk motor driving unit so as to change the upper limit value of the disk rotation speed to the upper limit value before the replacement of the disk or the value of the initial state.

In a case where the disk is replaced in the state of changing the first upper limit value of the disk rotation speed preset to the disk drive to the second slower upper limit value of the disk rotation speed by operating the program resided in the operating system, the second upper limit value of the disk rotation speed is maintained after the replacement of the disk unless any special operation is performed. Conversely, by handling the switch provided in the disk drive, the upper limit value of the disk rotation speed can be returned to the first upper limit value of the disk rotation speed.

According to the eleventh rotation speed changing method for a disk drive of the present invention, in the eighth rotation speed changing method for a disk drive of the present invention, the disk drive further comprises a switch connected to the controlling unit; and when the disk drive is turned on, according to the state of the switch, the disk motor driving unit is controlled so as to change the speed upper limit value of the disk rotation speed to the upper limit value of the disk rotation speed before the turn-off or the value of the initial state.

In a case where the disk drive is turned off in a state of changing the first upper limit value of the disk rotation speed preset to the disk drive to the second slower upper limit value of the disk rotation speed by operating the program resided in the operating system, when the disk drive is turned on again, the disk drive is operated at the first upper limit value of the disk rotation speed unless any special operation is performed. Conversely, by handling the switch provided in the disk drive, the upper limit value of the disk rotation speed can be returned to the second upper limit value of the disk rotation speed.

According to the twelfth rotation speed changing method for a disk drive of the present invention, in the third rotation speed changing method for a disk drive of the present invention, the disk drive further comprises;

a detecting unit for detecting whether or not the disk is replaced; and a memory for storing an upper limit value of a disk rotation speed before the replacement of the disk, the input apparatus comprises a switch, and when the detecting unit detects that the disk is replaced, according to the state of the switch, the controlling unit controls the disk motor driving unit so as to change the speed upper limit value to the upper limit value of the disk rotation speed before the replacement read out from the memory or a value of an initial state.

In a case where the disk is replaced in a state of changing the first upper limit value of the disk rotation speed preset to the disk state to the second slower upper limit value of the disk rotation speed by operating the program resided in the operating system, the second upper limit value of the disk rotation speed is maintained after replacing the disk unless any special operation is performed. Conversely, by handling the switch provided in the input apparatus, the upper limit value of the disk rotation speed can be returned to the first upper limit value of the disk rotation speed.

According to the thirteenth rotation speed changing method for a disk drive of the present invention, in the fifth rotation speed changing method for a disk drive of the present invention, the disk drive further comprises a recording unit connected to the controlling unit for recording the upper limit value of the disk rotation speed on the disk, and when an input indicating to record the upper limit value of the disk rotation speed on the disk is inputted from the input apparatus to the operating system, the operating system instructs the controlling unit to force the recording unit to record the upper limit value of the disk rotation speed on the disk.

A disk drive according to the present invention comprises:

a disk motor for rotating a disk;

a disk motor driving unit for driving the disk motor;

an inputting unit for inputting an upper limit value of a disk rotation speed;

a recording unit for recording the inputted upper limit value of the disk rotation speed on the disk; and a controlling unit for reading out an upper limit value of a disk rotation speed recorded on a new disk when the disk is replaced with the new disk, to set the read-out upper limit value of the disk rotation speed to the disk motor driving unit.

For example, in a write-once or rewritable disk drive, in a case where by writing the upper limit value of the disk rotation speed optionally selected by the user on a portion of the write-once or rewritable disk, the same disk drive reads the disk after that point, the upper limit value of the disk rotation speed of the disk drive can be set by referring to the upper limit value of the disk rotation speed written on the disk. Thereby, it is possible to automatically set the upper limit value of the disk rotation speed to the value, which is set by the user, for the same combination of the disk drive and the disk.

BRIEF DESCRIPTION OF DRAWINGS

FIG. 13 is a flowchart for describing an example of a program according to the present invention.

BEST MODE FOR CARRYING OUT THE INVENTION

Figure 1:
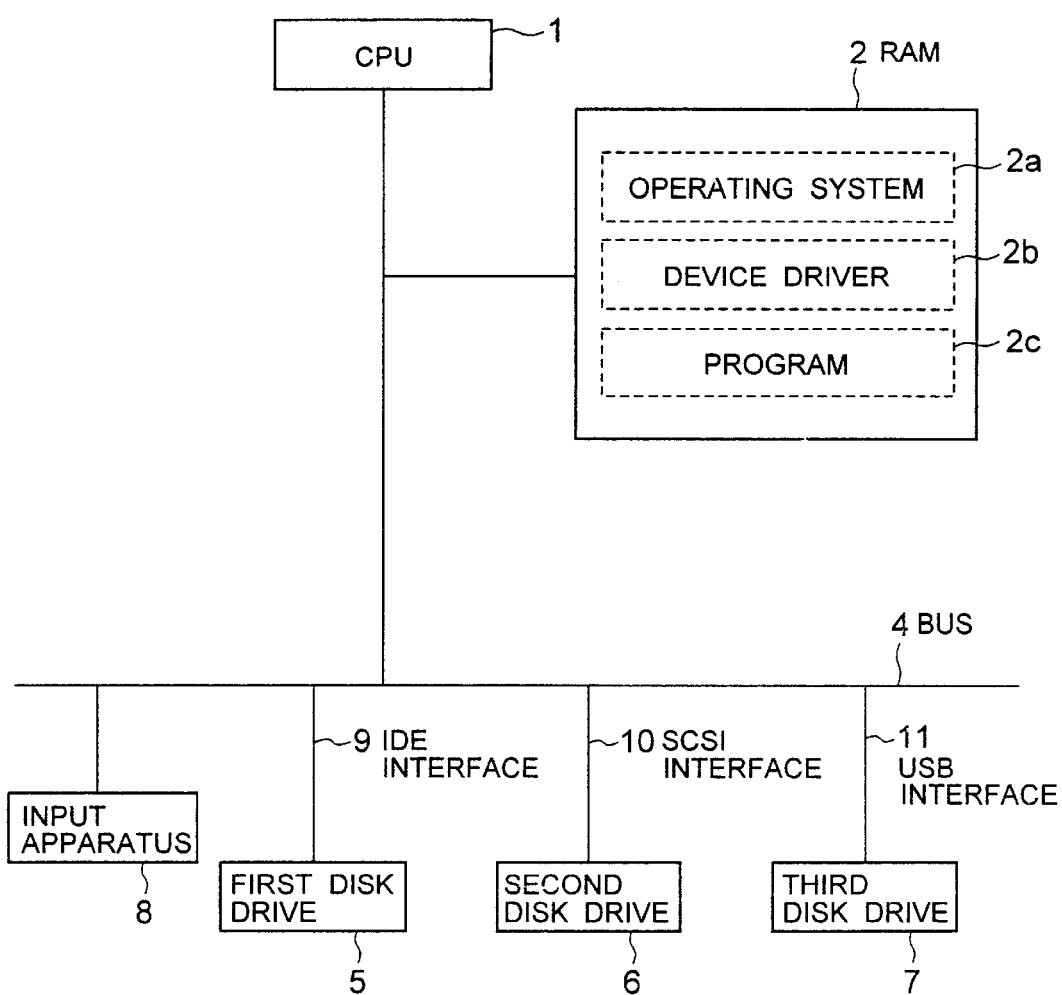
FIG. 1 is a block diagram showing a computer system according to the present invention.

As shown in FIG. 1, a computer system according to the present invention includes a CPU (Central Processing Unit) 1, a RAM (Random Access Memory) 2, a bus 4, first to third disk drives 5–7, and an input apparatus 8. Herein, the CPU 1 executes a software including a program according to the present invention and an operating system. An operating system 2a, a device driver 2b for controlling a device, and a program 2c according to the present invention for changing a rotation speed are loaded to the RAM 2. The bus 4 is a bus on the host computer for connecting the peripheral devices such as the input unit 8 and the first to third disk drives 5–7 to the CPU 1. The first disk drive 5 is connected to the bus 4 through an IDE interface 9. The second disk drive 6 is connected to the bus 4 through a SCSI interface 10. The third disk drive 7 is connected to the bus 4 through a USB interface 11. The input apparatus 8 is a device with which the user inputs data, and is a keyboard, a mouse or the like.

(First Embodiment)

Conventionally, a user could not directly control the device driver 2b. However, in a rotation speed changing method of a disk drive according to the first embodiment of the present invention, the user can control the device driver 2b to set the upper limit values of the disk rotation speeds of the first to third disk drives 5–7 to predetermined values using an ATAPI command.

Hereafter, the rotation speed changing method of the disk drive according to this embodiment will be described with reference to FIG. 2.

Figure 2:
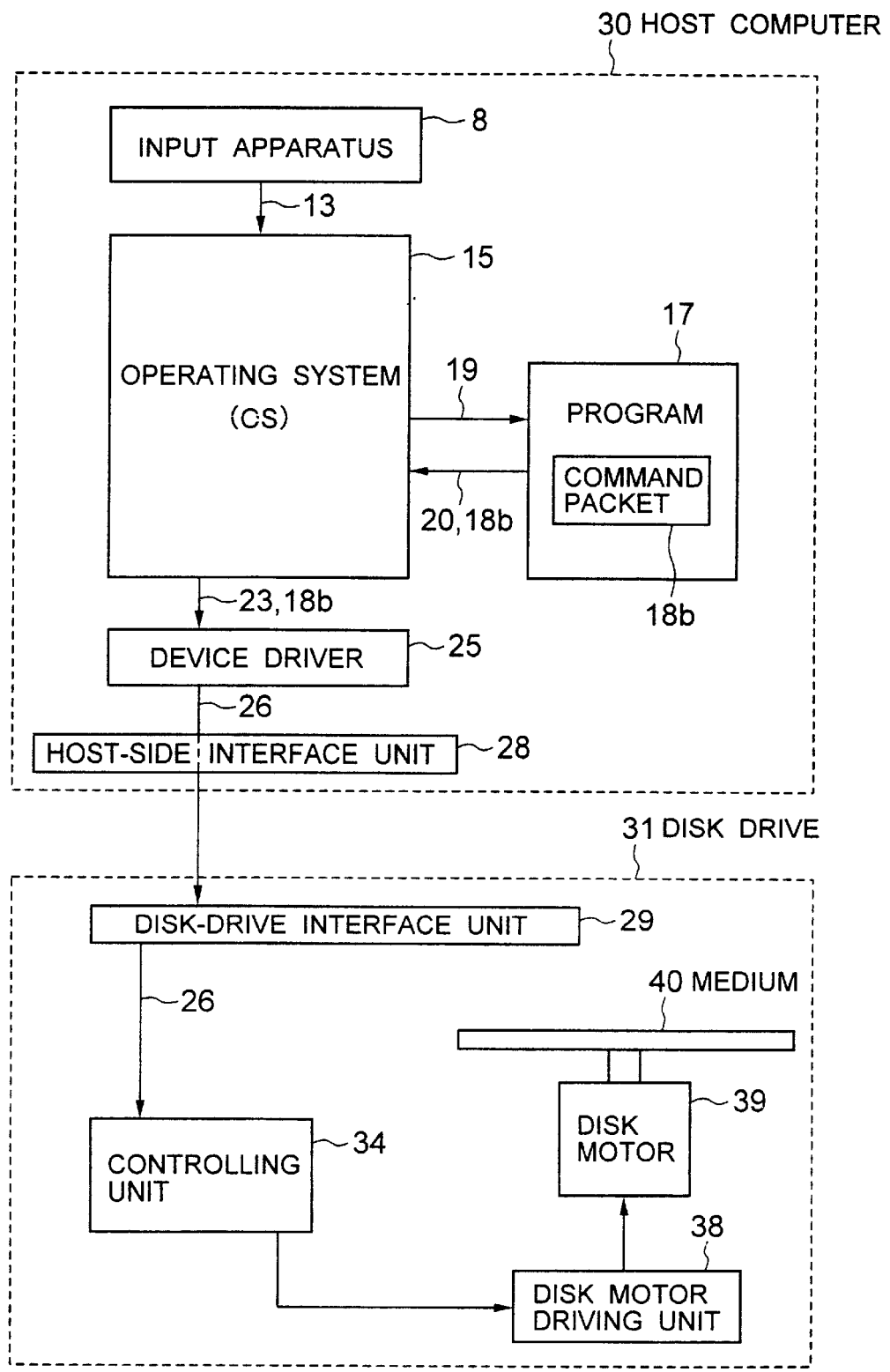
FIG. 2 is a diagram for describing a rotation speed changing method for a disk drive according to the first embodiment of the present invention.

As shown in FIG. 2, the computer system according to this embodiment includes a host computer 30 (corresponding to the CPU 1 shown in FIG. 1) and a disk drive 31 (corresponding to the first to third disk drives 5–7). The host computer 30 includes an input apparatus 8, an operating system 15 (corresponding to the operating system 2a shown in FIG. 1), a program 17 corresponding to the program 2c according to the present invention, a device driver 25 (corresponding to the device driver 2b shown in FIG. 1), and a host-side interface unit 28. The disk drive 31 includes a disk-drive interface unit 29, a controlling unit 34, a disk motor driving unit 38, and a disk motor 39 for rotating a medium (disk) 40.

When the user enters the desired upper limit value 13 of the rotation speed using the input apparatus 8 such as a keyboard or a mouse, the operating system 15 outputs the inputted content (upper limit value 13) as a rotation speed specification 19 to the program 17 to start the program 17. The program 17 interprets the rotation speed specification 19 to output a command issuing request 20 and a command packet 18b to the operating system 15. The command packet 18b includes the information on the upper limit value 13 of the disk rotation speed desired by the user. The operating system 15 receiving the command issuing request 20 and the command packet 18b outputs a command issuing command 23 and the command packet 18b to the device driver 25. The device driver 25 interprets the command packet 18b to outputs the interpreted result as a device command 26 to the disk drive interface unit 29 of the disk driver 31 through the host-side interface unit 28.

The disk drive interface unit 29 outputs the received device command 26 to the control unit 34. The controlling unit 34 controls the disk motor driving unit 38 on the basis of the device command 26 to set the upper limit value of the rotation speed of the disk motor 39 to the upper limit value 13 desired by the user.

(Second Embodiment)

A rotation speed changing method of a disk drive according to the second embodiment of the present invention will be described with reference to FIG. 3. The rotation speed changing method of the disk drive according to this embodiment is different from the rotation speed changing method of the disk drive according to the first embodiment in that a resident program 117 resided in an operating system 115 is used in place of the program 17 shown in FIG. 2.

When the user enters a desired upper limit value 113 of the disk rotation speed using an input apparatus 108 such as a keyboard or a mouse, the operating system 115 outputs the inputted content (upper limit value 113) as a rotation speed specification 119 to the resident program 117. The resident program 117 interprets the rotation speed specification 119 to output a command issuing request 120 and a command packet 118b to the operating system 115. The command packet 118b includes information on the upper limit value 113 of the disk rotation speed desired by the user. The operating system 115 receiving the command issuing request 120 and the command packet 118b outputs a command issuing command 123 and the command packet 118b to a device driver 125. The device driver 125 interprets the command packet 118b to output the interpreted result as a device command 126 to a disk drive interface unit 129 of a disk drive 131 through a host side interface unit 128.

The disk drive interface unit 129 outputs the received device command 126 to a controlling unit 134. The controlling unit 134 controls a disk motor driving unit 138 on the basis of the device command 126 to set the upper limit value of the rotation speed of a disk motor 139 to the upper limit value 113 desired by the user.

(Third Embodiment)

Figure 4:
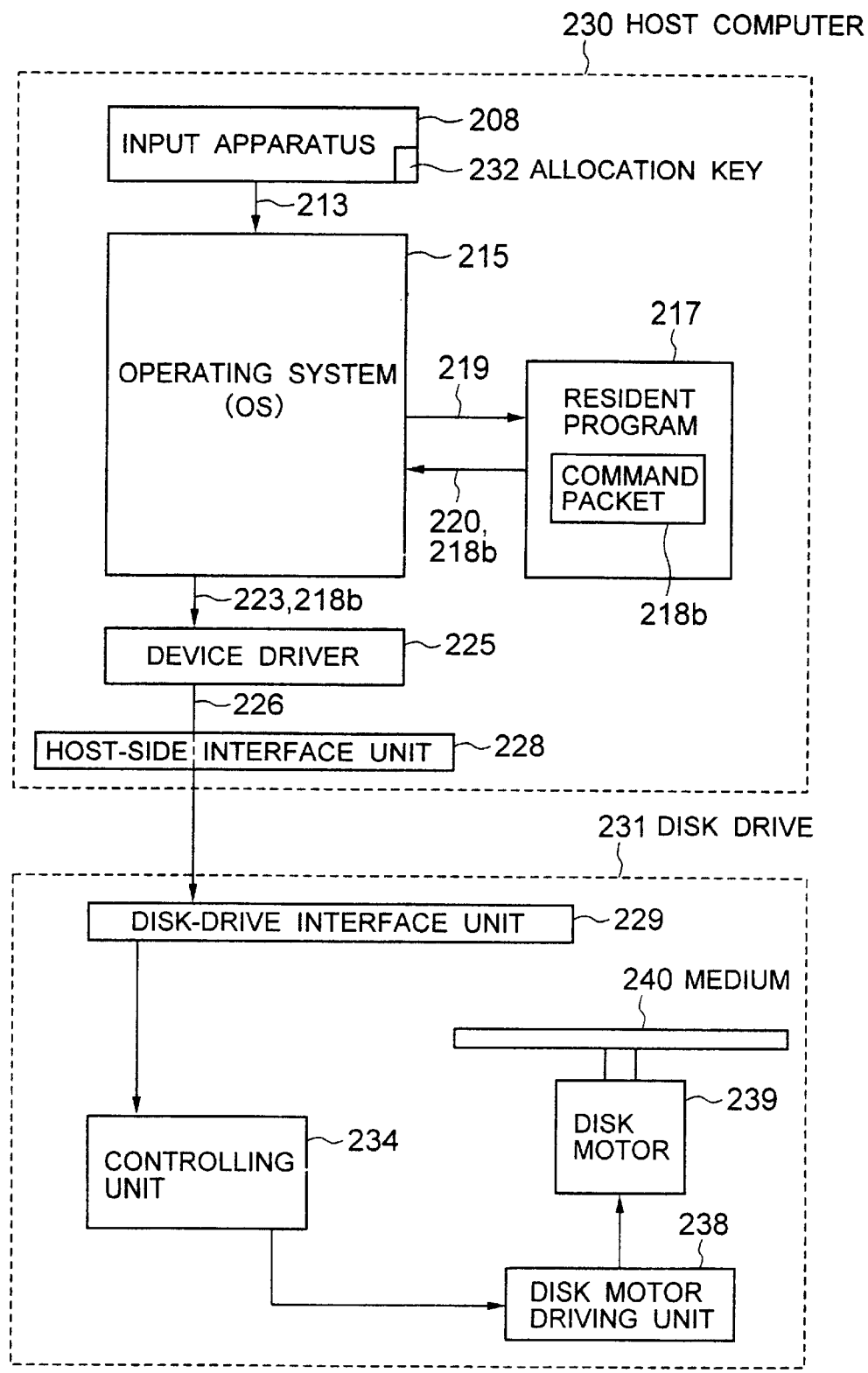
FIG. 4 is a diagram for describing a rotation speed changing method for a disk drive according to the third embodiment of the present invention.

A rotation speed changing method of a disk drive according to the third embodiment of the present invention will be described with reference to FIG. 4.

In the rotation speed changing method of the disk drive according to this embodiment, the user allocates a start-up command of a resident program 17 to an allocation key 232 (the user-reservable key) provided in an input apparatus 208 such as a keyboard. By handling the allocation key 232, the user can easily enter an input for changing a speed (an input of an upper limit value 213) into the disk drive 231. For example, a function key is reserved on a keyboard, and the resident program 17 is started by pressing this function key. The started resident program 17 displays the upper limit value candidates (for example, 12-times, 16-times) of the disk rotation speed on the monitor. The user can select one of the upper limit value candidates displayed on the monitor using an arrow key or a mouse. Thereby, the upper limit value 213 of the disk rotation speed is inputted.

When the user enters an input of changing the speed of a disk drive 231 (the input of the upper limit value 213), an operating system 215 inputs a rotation speed specification 219 to the resident program 217. In response, the resident program 217 outputs a command issuing request 220 to the operating system 215, and outputs a command packet 218b, which includes information on the upper limit value 213 of the disk rotation speed desired by the user, to the operating system 215. The operating system 215 receiving the command packet 218b outputs a command issuing command 233 to a device driver 235, and directly outputs the received command packet 218b to the device driver 225. Afterwards, the device driver 225 outputs a device command 226 to a disk device interface unit 229 of a disk drive 231 through a host side interface unit 28.

Figure 3:
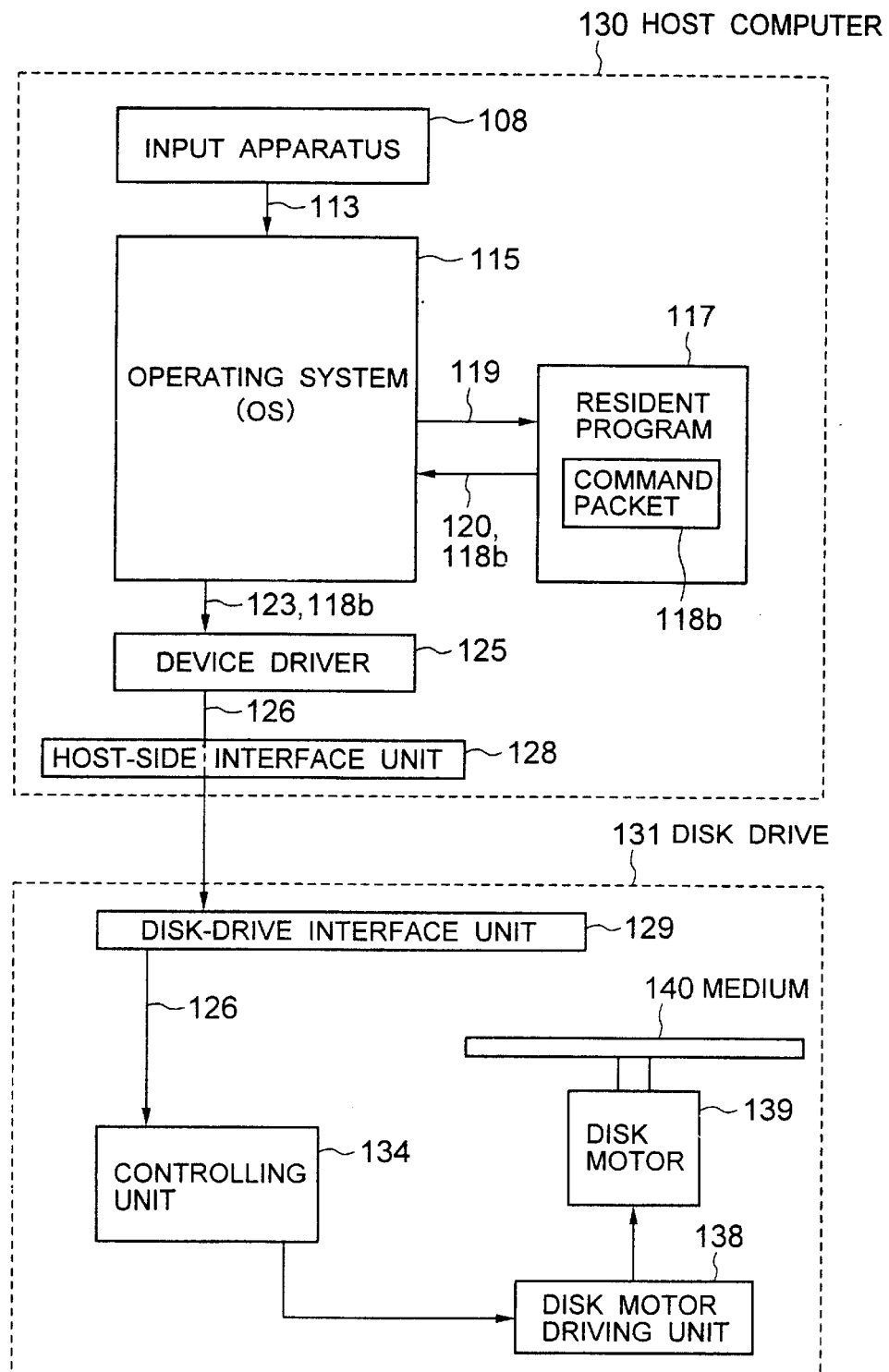
FIG. 3 is a diagram for describing a rotation speed changing method for a disk drive according to the second embodiment of the present invention.

The operation of the disk drive 231 is analogous to that of the disk drive 131 shown in FIG. 3. Hence, the detailed description thereabout is left out.

The allocation key 232 of the input apparatus 208 may be provided on the keyboard, the mouse or the disk drive itself.

(Fourth Embodiment)

A rotation speed changing method of a disk drive according to the fourth embodiment of the present invention will be described with reference to FIG. 5.

In the rotation speed changing method of the disk drive according to this embodiment, the user can start up a normal program 312 running on an operating system using a dedicated key 332 provided in an input apparatus 308 such as a keyboard. Thereby, it is possible for the user to enter an input for changing a speed (an input of an upper limit value 313) to a disk driver 331 more easily. For example, an internet key or a mail key on the keyboard is reserved, and the normal program 312 is started by pressing this key. The started normal program 312 displays the upper limit value candidates (for example, 12-times, 16-times) of the disk rotation speed on the monitor. The user may select one of the upper limit value candidates displayed on the monitor using an arrow key or a mouse. Thereby, the upper limit value 313 of the disk rotation speed is inputted.

When the user performs the input for changing the speed of the disk drive 231 (the input of the upper limit value 313), an operating system 315 outputs a request signal 314 to the normal program 312. After receiving the request signal 314, the normal program 312 outputs a request signal 316 to the operating system 315. After receiving the request signal 316, the operating system 315 outputs a command packet 318a (including information on the upper limit value 313 of the disk rotation speed desired by the user), which is created by itself, to a device driver 325, and outputs a command issuing request 323 to the device drive 325. The device driver 325 issues a device command 326 to a disk drive interface unit 329 of a disk drive 331 through a host interface unit 328.

The operation of the disk drive 331 is analogous to the operation of the disk drive 131 shown in FIG. 3. Hence, the detailed description thereabout is left out.

The dedicated key 332 of the input apparatus 308 may be provided on the keyboard, the mouse or the disk driver itself.

(Fifth Embodiment)

A rotation speed changing method of a disk drive according to the fifth embodiment of the present invention will be described with reference to FIG. 6.

In the rotation speed changing method of the disk drive according to this embodiment, the user may start up a resident program 417 using a dedicated key 432 provided on an input apparatus 408 such as a keyboard. Thereby, it is possible for the user to enter an input for changing a speed (input of an upper limit value 413) into a disk drive 431 more easily. For example, after an internet key or a mail key on a keyboard is reserved, the user can start up the resident program 417 by pressing this key. The started resident program 417 displays the upper limit value candidates (for example, 12-times, 16-times) of the disk rotation speed on a monitor. The user can select one of the upper limit value candidates displayed on the monitor using an arrow key or a mouse. Thereby, it is possible to input the upper limit value 413 of the disk rotation speed.

When the user performs the input for changing the speed (input of the upper limit value 413) of the disk driver 431, an operating system 415 inputs a rotation speed specification 419 to the resident program 417. In response, the resident program 417 outputs a command issuing request 420 to the operating system 415, and outputs a command packet 418b, which includes information on the upper limit value 413 of the disk rotation speed desired by the user, to the operating system 415. The operating system 415 receiving the command packet 418b outputs a command issuing command 423 to a device driver 425, and outputs the command packet 418b to the device driver 425 as it is. Afterwards, the device driver 425 outputs a device command 426 to a disk drive interface unit 429 of a disk drive 431 through a host side interface unit 428.

The operation of the disk driver 431 is analogous to the operation of the disk drive 131 shown in FIG. 3. Hence, the detailed description thereabout is left out.

The dedicated key 432 of the input apparatus 408 may be provided on the keyboard, the mouse, or the disk drive itself.

(Sixth Embodiment)

Figure 7:
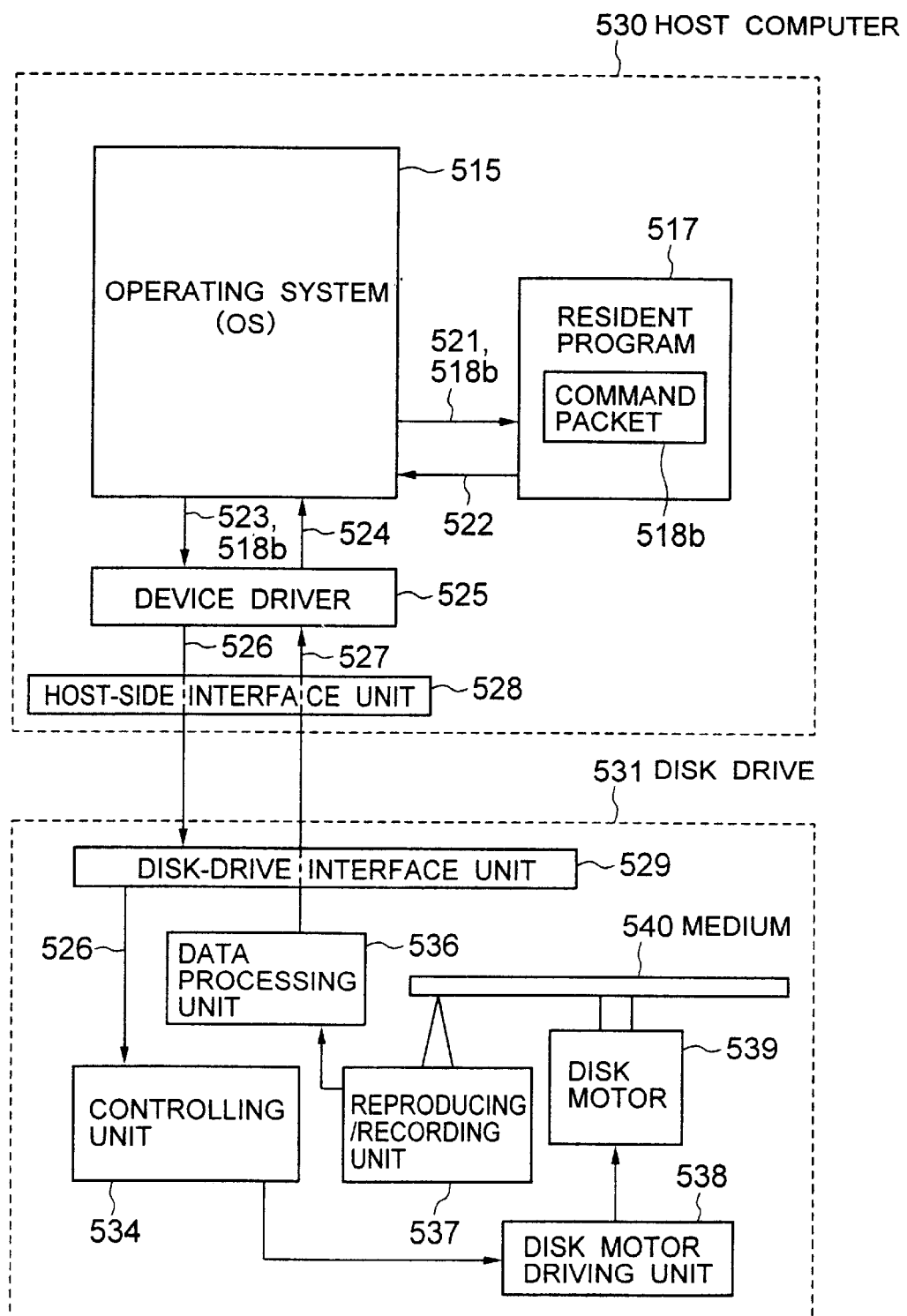
FIG. 7 is a diagram for describing a rotation speed changing method for a disk drive according to the sixth embodiment of the present invention.

A rotation speed changing method of a disk drive according to the sixth embodiment of the present invention will be described with reference to FIG. 7.

When a medium 540 (disk) of a disk drive 531 such as a CD-ROM is replaced, a reproducing/recording unit 537 provided in the disk drive 531 detects the replacement of the medium to output the detection result to a data processing unit 536. In response, the data processing unit 536 outputs a medium replacing signal 527 to a device driver 525 through a disk-drive interface unit 529 and a host-side interface unit 528. In response to this, the device driver 525 outputs a medium replacing notice 524 to an operating system 515. The operating system 515 outputs a medium replacing notice/processing request 522 to a resident program 517 to request the operation for the medium replacement. The resident program 517 determines that it is the request of changing the speed to the first upper limit value of the disk rotation speed preset to the disk drive 531. Then, the resident program 517 outputs a command issuing request 521 to the operating system 515, and outputs a command packet 518b including the first upper limit value of the disk rotation speed to the operating system 515. The operating system 515 receiving the command packet 518b outputs a command issuing instruction 523 to a device drive 525, and outputs the received command packet 518b to the device drive 525 as it is. The device driver 525 outputs a device command 526 to a disk-drive interface unit 529 of the disk drive 531 through the host-side interface unit 528.

The disk-drive interface unit 529 outputs the received device command 526 to a controlling unit 534. The controlling unit 534 controls a disk motor driving unit 538 on the basis of the device command 526 to set the upper limit value of the rotation speed of a disk motor 539 to the first upper limit value of the disk rotation speed.

(Seventh Embodiment)

Figure 8:
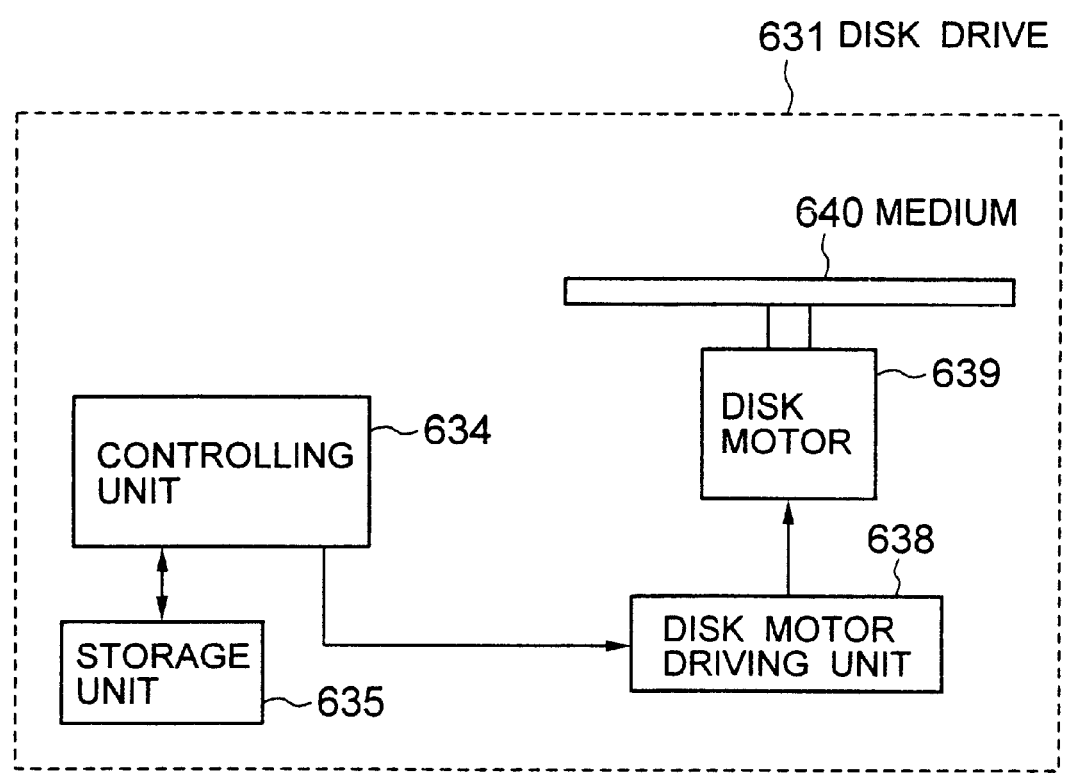
FIG. 8 is a diagram for describing a rotation speed changing method for a disk drive according to the seventh embodiment of the present invention.

A rotation speed changing method of a disk drive according to the seventh embodiment of the present invention will be described with reference to FIG. 8.

When a disk drive 631 such as a CD-ROM is turned on, a controlling unit 634 controls a disk motor driving unit 638 by referring to the upper limit value of the disk rotation speed before the turn-off stored in a storage unit 635 of the disk drive 631 to set the upper limit value of the rotation speed of a disk motor 639 to the upper limit value of the disk rotation before the turn-off.

(Eighth Embodiment)

Figure 9:
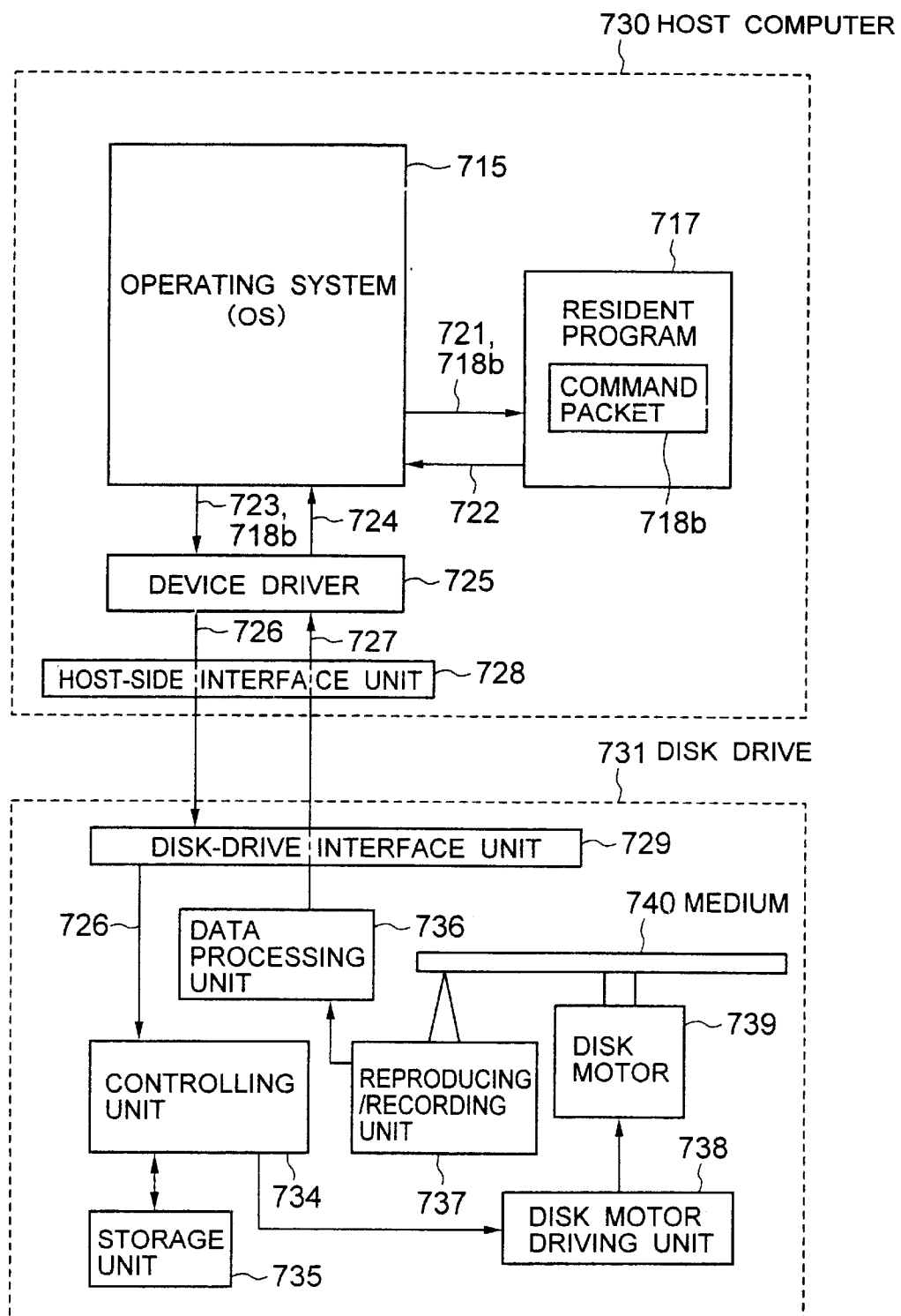
FIG. 9 is a diagram for describing a rotation speed changing method for a disk drive according to the eighth embodiment of the present invention.

A rotation speed changing method of a disk drive according to the eighth embodiment of the present invention will be described with reference to FIG. 9.

When a medium 740 of a disk drive 731 such as a CD-ROM is replaced, a reproducing/recording unit 737 of the disk drive 731 detects the replacement of the medium to output the detection result to a data processing unit 736. In response to this, the data processing unit 736 outputs a medium replacing signal 727 to a device driver 725 through a disk-drive interface unit 729 and a host-side interface unit 728. In response to this, the device driver 725 outputs a medium replacing notice 724 to an operating system 715. The operating system 715 outputs a medium replacing notice/processing request 722 to a resident program 717 to request the operation for the medium replacement. In response to this, the resident program 717 outputs a command issuing request 721 to the operating system 715, and output a command packet 718b, which includes an instruction for setting the speed to the upper limit value of the disk rotation speed before the replacement, to the operating system 715. The operating system 715 receiving the command packet 718b outputs a command issuing request 723 to a device driver 725, and outputs the received command packet 718b to the device driver 725 as it is. The device driver 725 outputs a device command 726 to the disk-drive interface unit 729 of the disk drive 731 through the host-side interface unit 728.

The disk-drive interface unit 729 outputs the device command 726 to a controlling unit 734. The controlling unit 734 controls a disk motor driving unit 738 by referring to the upper limit value of the disk rotation speed before the replacement of the medium 740 stored in a storage unit 735 to set the upper limit value of the rotation speed of the disk motor 739 to the upper limit value of the disk rotation speed before the replacement of the medium 740.

(Ninth Embodiment)

A rotation speed changing method of a disk drive according to the ninth embodiment of the present invention will be described with reference to FIG. 10.

In the rotation speed changing method of a disk drive according to this embodiment, a controlling unit 834 refers usually to the upper limit value of the disk rotation speed before the replacement of a medium 840 stored in a storage unit 835 of a disk drive 831 to maintain the upper limit value of the disk rotation speed before the replacement even after replacing the medium 840, in the same way as the rotation speed changing method of a disk drive method according to the eighth embodiment mentioned above. However, when a user handles a dedicated switch 833 provided in the disk drive 831, the controlling unit 834 returns the upper limit value of the disk rotation speed to a value of an initial state after the replacement of the medium 840.

(Tenth Embodiment)

A rotation speed changing method of a disk drive according to the tenth embodiment of the present invention will be described with reference to FIG. 11.

In the rotation speed changing method of a disk drive of this embodiment, a control unit 934 sets usually the upper limit value of the disk rotation speed to a value of an initial state when a disk drive 931 such as a CD-ROM is turned on. However, when a user handles a dedicated switch 933 provided in the disk drive 931, the controlling unit 934 sets the upper limit value of the disk rotation speed before the turn-off, which is stored in a storage unit 935, to a disk motor driving unit 968.

(Eleventh Embodiment)

A rotation speed changing method of a disk drive according to an eleventh embodiment of the present invention will be described with reference to FIG. 10.

Figure 10:
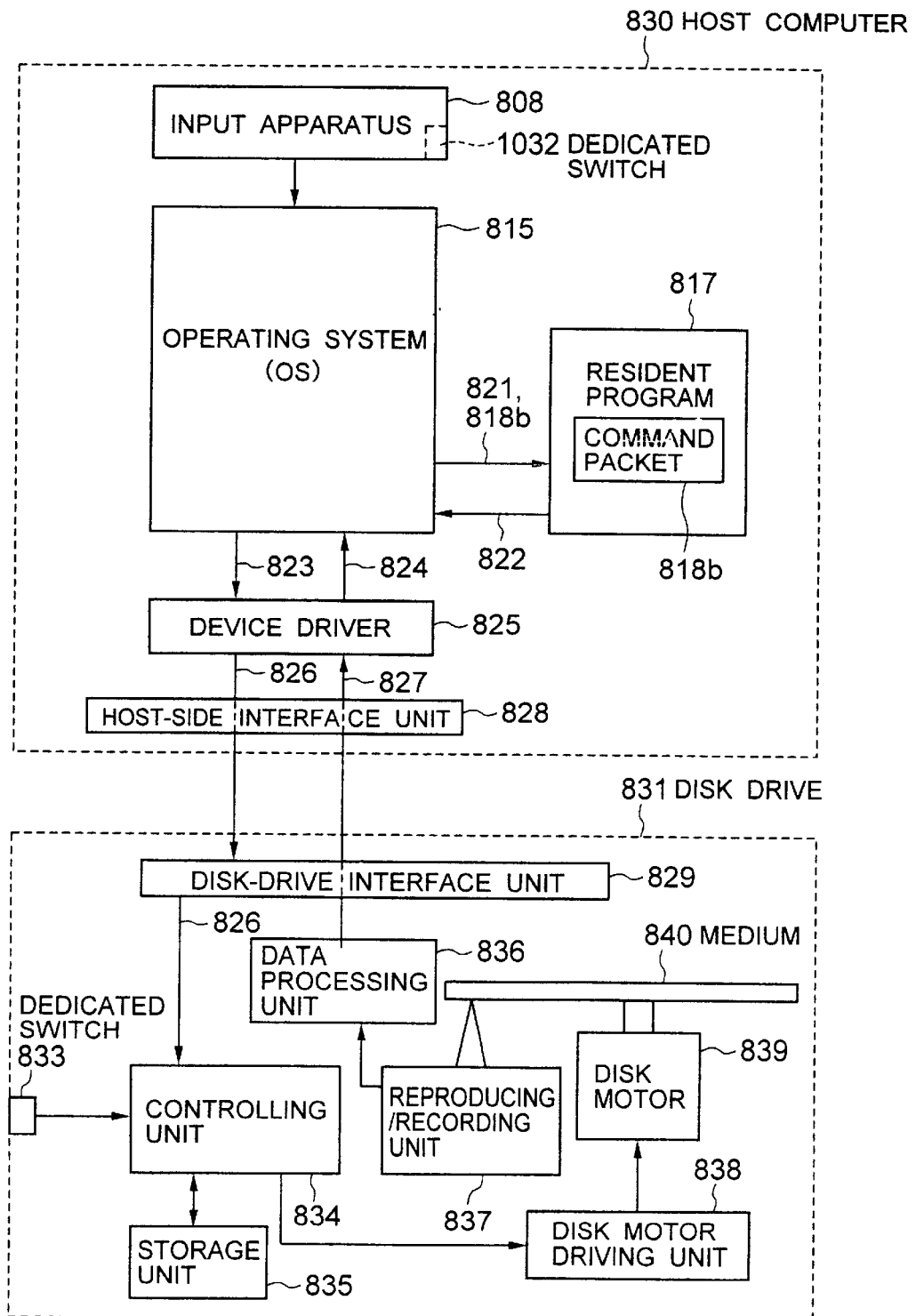
FIG. 10 is a diagram for describing a rotation speed changing method for a disk drive according to the ninth and eleventh embodiments of the present invention.

In the rotation speed changing method of a disk drive according to the ninth embodiment shown in FIG. 10, the controlling unit 834 returns the upper limit value of the disk rotation speed to the value of the initial state after the replacement of the medium 840. However, in the rotation speed changing method of a disk drive according to this embodiment, a dedicated switch 1032 is provided in the input apparatus 808 of the host computer 830. When a user handles the dedicated switch 1032, the controlling unit 834 returns the upper limit value of the disk rotation speed to the value of the initial state after the replacement of the medium 840.

(Twelfth Embodiment)

Figure 12:
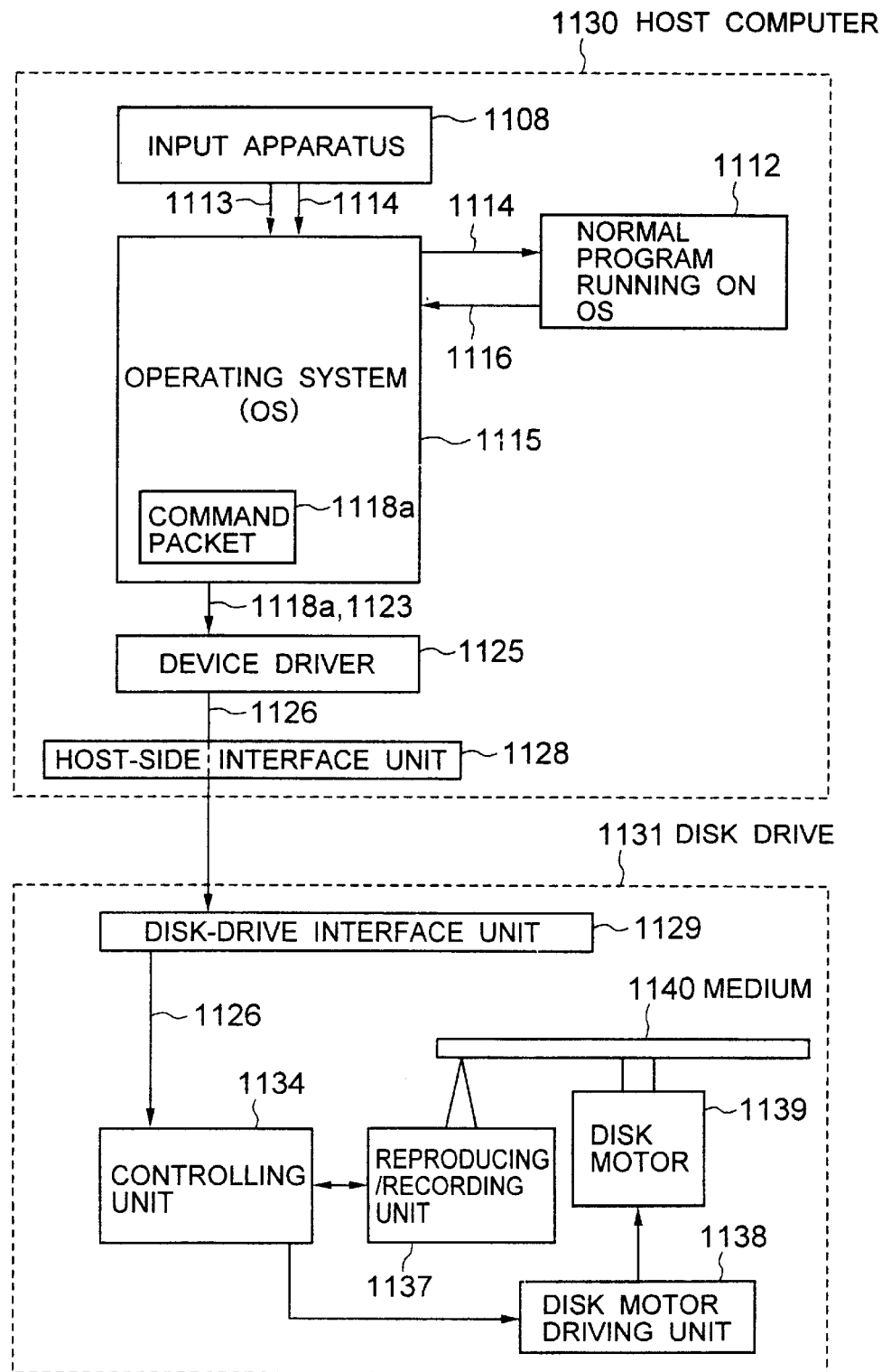
FIG. 12 is a diagram for describing a rotation speed changing method for a disk drive according to the twelfth embodiment of the present invention.

A rotation speed changing method of a disk drive according to the twelfth embodiment of the present invention will be described with reference to FIG. 12.

In order to change the speed, a user inputs a desired upper limit value (input value) 1113 of a disk rotation speed into an operating system 1115 using an input apparatus 1108 of a host computer 1130. The operating system 1112 receiving the upper limit value 1113 outputs a request signal 1114 to a normal program 1112 running on the operating system. In response to this, the normal program 1112 outputs a request signal 1116 to the operating system 1115. In response to the request signal 1116, the operating system 1115 outputs a command issuing request 1123 to a device driver 1125, and outputs a command packet 1118a (including information on the upper limit value 1113 of the disk rotation speed desired by the user), which is produced by the operating system 1115 itself, to a device driver 1125. Afterwards, the device driver 1125 outputs a device command 1126 to a disk-drive interface unit 1129 of a disk drive 1131 through a host-side interface unit 1128.

The disk-drive interface unit 1129 outputs the received device command 1126 to a controlling unit 1134. The controlling unit 1134 controls a disk motor driving unit 1138 on the basis of the device command 1126 to set the upper limit value of the disk rotation speed of a disk motor 1139 to the upper limit value 1113.

In response to an inquiry as to whether or not this setting is recorded on a medium 1140, the user enters an input 1114 indicating that the setting is recorded, using the input apparatus 1108. The operating system 1115 receiving the input 1114 outputs the request signal 1114 to the normal program 1112. In response to this, the normal program 1112 outputs the request signal 1116 to the operating system 1115. The operating system 1115 receiving the request signal 1116 outputs the command packet 1118a (including information on the recording of the setting), which is produced by the operating system 1115 itself, to the device driver 1125, and outputs a command issuing request 1123 to the device driver 1125. The device driver 1125 outputs the device command 1126 to the disk-drive interface unit 1129 through the host-side interface unit 1128.

The disk-drive interface unit 1129 output the received device command 1126 to the controlling unit 1134. The controlling unit 1134 controls a reproducing/recording unit 1137 on the basis of the device command 1126 to record the upper limit value 1113, which is entered by the user, on the medium 1140.

Afterwards, when the medium 1140 is reproduced, the controlling unit 1134 controls the disk motor driving unit 1138 on the basis of the upper limit value of the disk rotation speed read out from the medium 1140 by the reproducing/recording unit 1137 to rotate the disk motor 1139 at the upper limit value 1113 of the disk rotation speed desired by the user.

(Other Embodiments)

The combination of any ones of the first to twelfth embodiments may be realized as another rotation speed changing method of a disk drive.

Figure 5:
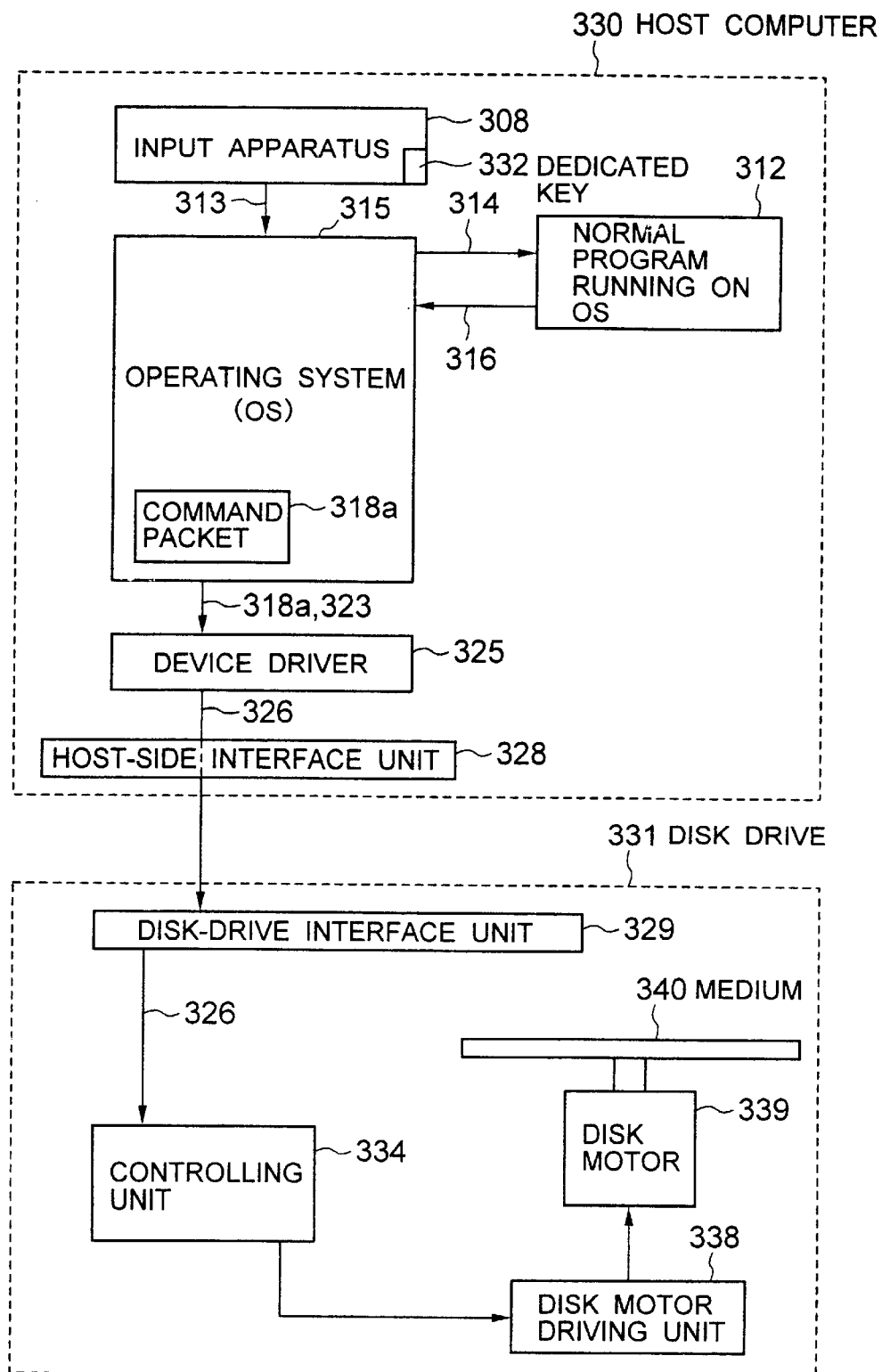
FIG. 5 is a diagram for describing a rotation speed changing method for a disk drive according to the fourth embodiment of the present invention.
Figure 6:
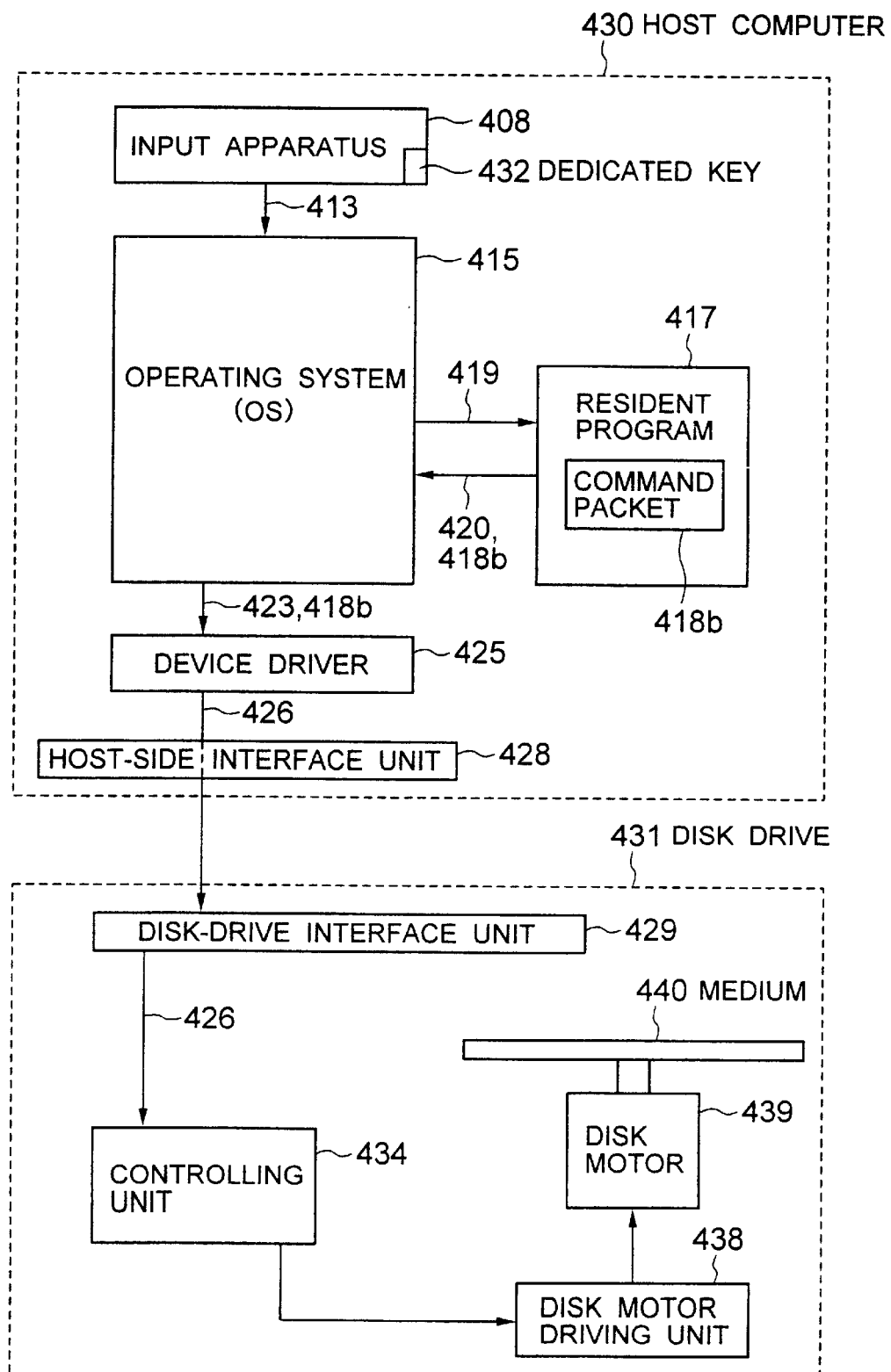
FIG. 6 is a diagram for describing a rotation speed changing method for a disk drive according to the fifth embodiment of the present invention.

In place of the dedicated key 332 shown in FIG. 5 and the dedicated key 432 shown in FIG. 6, for example, a switch for reproducing the disk drive and a switch for setting the upper limit value of the disk rotation speed may be provided in the keyboard.

Figure 11:
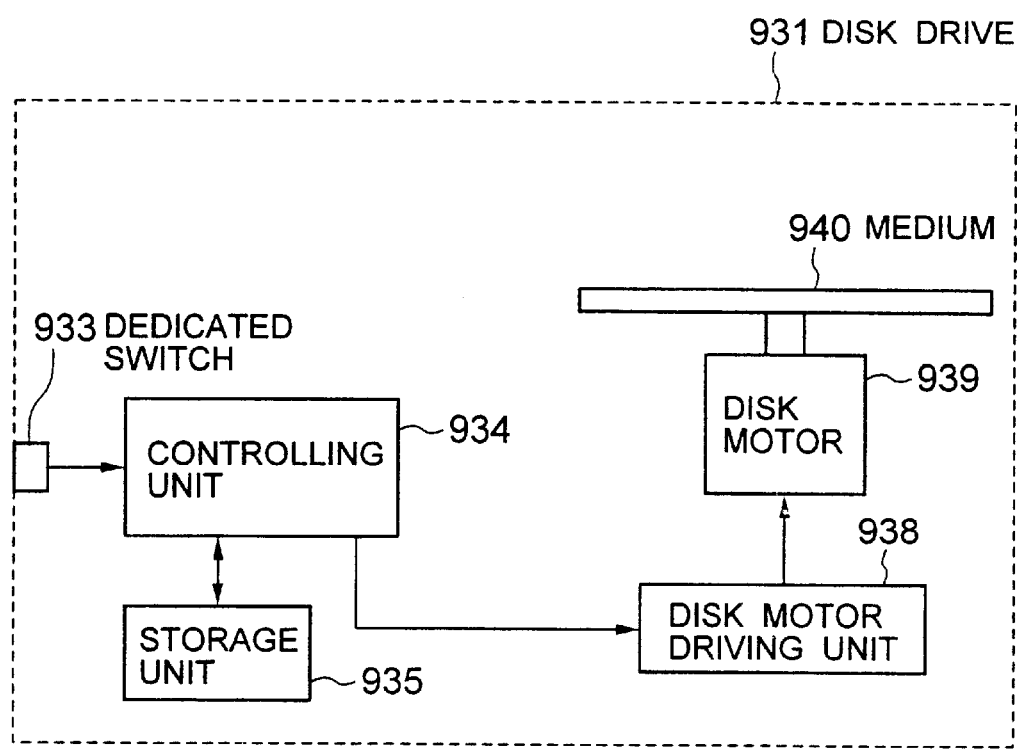
FIG. 11 is a diagram for describing a rotation speed changing method for a disk drive according to the tenth embodiment of the present invention.

In place of the dedicated key 332 shown in FIG. 5, the dedicated key 432 shown in FIG. 6, the dedicated switches 833 and 1032 shown in FIG. 10, and the dedicated switch 933 shown in FIG. 11, a switch which can be used together with another function may be used.

What is claimed is:

1. A rotation speed changing method for a disk drive comprising a disk motor for rotating a disk, a disk motor driver for driving said disk motor, a controller device for controlling said disk motor driver, and a detector for detecting whether or not said disk is replaced, said method comprising:

receiving an upper limit value of a disk rotation speed as an input value;

interpreting said input value as a rotation speed specification to generate a command packet including said upper limit value of the disk rotation speed;

outputting said command packet to said controller of said disk drive;

setting, with said controller, an upper limit of the disk rotation speed, for the disk motor driver, to said upper limit value included in said command packet;

driving said disk motor at said set upper limit of the disk rotation speed with said disk motor driver; and controlling, with said controller, said disk motor driver to set the upper limit of said disk rotation speed to a value of an initial state, when said detector detects that said disk is replaced, wherein:

said disk drive is controlled by a computer, said computer is operated by a program that performs said receiving and generating operations, and said program resides in said computer.

2. A rotation speed changing method for a disk drive comprising a disk motor for rotating a disk, a disk motor driver for driving said disk motor, a controller for controlling said disk motor driver, and a memory, said method comprising:

receiving an upper limit value of a disk rotation speed as an input value;

interpreting said input value as a rotation speed specification to generate a command packet including said upper limit value of the disk rotation speed;

outputting said command packet to said controller of said disk drive;

setting, with said controller, an upper limit of the disk rotation speed, for the disk motor driver, to said upper limit value included in said command packet;

driving said disk motor at said set upper limit of the disk rotation speed with said disk motor driver;

storing in said memory said upper limit value of the disk rotation speed before turning off of said disk device; and reading out of said memory, with said controller, said upper limit value of the disk rotation speed stored before the turn-off and setting the upper limit of the disk rotation speed to the read-out upper limit value, when said disk drive is turned on.

3. A rotation speed changing method for a disk drive comprising a disk motor for rotating a disk, a disk motor driver for driving said disk motor, a controller for controlling said disk motor driver, a memory, and a detector for detecting whether or not said disk is replaced, said method comprising:

receiving an upper limit value of a disk rotation speed as an input value;

interpreting said input value as a rotation speed specification to generate a command packet including said upper limit value of the disk rotation speed;

outputting said command packet to said controller of said disk drive;

setting, with said controller, an upper limit of the disk rotation speed, for the disk motor driver, to said upper limit value included in said command packet;

driving said disk motor at said set upper limit of the disk rotation speed with said disk motor driver;

storing in said memory said upper limit value of the disk rotation speed before replacement of said disk; and reading out of said memory, with said controller, said upper limit value of the disk rotation speed stored before the disk replacement and setting the upper limit of the disk rotation speed to the read-out upper limit value, when said detector detects that said disk is replaced, wherein:

said disk drive is controlled by a computer, said computer is operated by a program that performs said receiving and generating operations, and said program resides in said computer.

4. A rotation speed changing method for a disk drive comprising a disk motor for rotating a disk, a disk motor driver for driving said disk motor, a controller for controlling said disk motor driver, a memory, and a switch connected to said controller, said method comprising:

receiving an upper limit value of a disk rotation speed as an input value;

interpreting said input value as a rotation speed specification to generate a command packet including said upper limit value of the disk rotation speed;

outputting said command packet to said controller of said disk drive;

setting, with said controller, an upper limit of the disk rotation speed, for the disk motor driver, to said upper limit value included in said command packet;

driving said disk motor at said set upper limit of the disk rotation speed with said disk motor driver;

storing in said memory said upper limit value of the disk rotation speed before turning off of said disk device; and reading out of said memory, with said controller, said upper limit value of the disk rotation speed stored before the turn-off and setting the upper limit of the disk rotation speed to the read-out upper limit value or a value of an initial state, in accordance with a state of the switch, when said disk drive is turned on.

5. A rotation speed changing method for a disk drive comprising a disk motor for rotating a disk, a disk motor driver for driving said disk motor, a controller for controlling said disk motor driver, a memory, and a detector for detecting whether or not said disk is replaced, said method comprising:

receiving an upper limit value of a disk rotation speed as an input value;

interpreting said input value as a rotation speed specification to generate a command packet including said upper limit value of the disk rotation speed;

outputting said command packet to said controller of said disk drive;

setting, with said controller, an upper limit of the disk rotation speed, for the disk motor driver, to said upper limit value included in said command packet;

driving said disk motor at said set upper limit of the disk rotation speed with said disk motor driver;

storing in said memory said upper limit value of the disk rotation speed before replacement of said disk; and reading out of said memory, with said controller, said upper limit value of the disk rotation speed stored before the disk replacement and setting the upper limit of the disk rotation speed to the read-out upper limit value or a value of an initial state, when said detector detects that said disk is replaced, wherein:

said disk drive is controlled by a computer, said computer is operated by a program that performs said receiving and generating operations, and said program resides in said computer.

6. The rotation speed changing method of claim 5, wherein:

the disk drive further comprises a switch connected to said controller; and said upper limit of the disk rotation speed is set to the read-out upper limit value or said initial state value, in accordance with a state of the switch, when said detector detects that said disk is replaced.

7. A rotation speed changing method for a disk drive comprising a disk motor for rotating a disk, a disk motor driver for driving said disk motor, a controller for controlling said disk motor driver, and a recording device connected to said controller for recording, said method comprising:

receiving an upper limit value of a disk rotation speed as an input value;

interpreting said input value as a rotation speed specification to generate a command packet including said upper limit value of the disk rotation speed;

outputting said command packet to said controller of said disk drive;

setting, with said controller, an upper limit of the disk rotation speed, for the disk motor driver, to said upper limit value included in said command packet;

driving said disk motor at said set upper limit of the disk rotation speed with said disk motor driver; and instructing, with an operating system, said controller to control said recording device to record said upper limit value of the disk rotation speed on said disk when an input, indicating that said upper limit value of the disk rotation speed is to be recorded on said disk, is entered from an input apparatus to said operating system, wherein:

said disk drive is controlled by a computer, said computer includes said input apparatus and said operating system, which is connected to said input apparatus, and said computer is operated by a program running on said operating system, a key for starting said program running on said operating system is allocated to said input apparatus, and when said program running on said operating system is started by said key, said operating system executes said receiving, generating, and outputting operations.

8. A disk drive comprising:

a disk motor for rotating a disk;

a disk motor driver that drives said disk motor;

an input device that inputs an upper limit value of a disk rotation speed;

a recording device that records said inputted upper limit value of the disk rotation speed on said disk; and a controller device that reads out said upper limit value of the disk rotation speed recorded on a new disk and sets said read-out upper limit value as a new upper limit of the disk rotation speed for said disk motor driver, when said disk is replaced with said new disk.

* * * * *